United States Patent
Asakura et al.

[11] Patent Number: 6,042,947
[45] Date of Patent: Mar. 28, 2000

[54] LAMINATE INCLUDING OPTICALLY FUNCTIONING FILM

[75] Inventors: Motoh Asakura; Kazuya Kobayashi; Shinji Nishikawa, all of Matsusaka, Japan

[73] Assignee: Central Glass Company, Limited, Yamaguchi, Japan

[21] Appl. No.: 08/773,505

[22] Filed: Dec. 23, 1996

[30] Foreign Application Priority Data

Dec. 25, 1995 [JP] Japan ..................................... 7-337217

[51] Int. Cl.⁷ ..................................................... B32B 17/10
[52] U.S. Cl. ......................... 428/437; 428/430; 428/436; 428/441
[58] Field of Search ................................. 428/426, 411.1, 428/216, 437, 34, 46, 68, 441, 442, 412, 698, 699, 555, 436, 430; 296/84.1

[56] References Cited

U.S. PATENT DOCUMENTS

| | | | |
|---|---|---|---|
| 4,107,366 | 8/1978 | Reiser et al. ............................. | 428/215 |
| 5,227,241 | 7/1993 | Chaussade et al. ...................... | 428/437 |
| 5,318,830 | 6/1994 | Takamatsu et al. ..................... | 428/216 |
| 5,443,669 | 8/1995 | Tunker .................................... | 156/102 |
| 5,496,621 | 3/1996 | Makita et al. ........................... | 428/216 |
| 5,612,820 | 3/1997 | Schrenk et al. ......................... | 359/498 |
| 5,635,287 | 6/1997 | Bailan et al. ............................ | 428/216 |
| 5,792,559 | 8/1998 | Heithoff et al. ........................ | 428/437 |

FOREIGN PATENT DOCUMENTS 2-141720  5/1990  Japan .
2-14720   5/1990  Japan .

OTHER PUBLICATIONS

"Methods for Specification of Colour Differences for Opaque Materials," JIS Z 8730, Mar. 1, 1970, pp. 1389–1392.

"Safety Glass for Road Vehicles," JIS R 3211, Jul. 1, 1979, pp. 1536–1544.

"Test Method of Safety Glass for Road Vehicles," JIS R 3212, Jul. 1, 1979, pp. 70–82.

*Primary Examiner*—Deborah Jones
*Assistant Examiner*—Stephen Stein
*Attorney, Agent, or Firm*—Evenson, McKeown, Edwards & Lenahan, P.L.L.C.

[57] ABSTRACT

A laminated glass to be used as a front windshield of an automotive vehicle including a head-up display system. The laminated glass comprises outboard-side and inboard-side glass plates. An intermediate film is interposed between the inboard-side and outboard-side glass plates to bond the glass plates to each other. An optically functioning film such as a polarization-direction changing film is bonded to the outboard-side glass plate. At least one of the inboard-side glass plate, the outboard-side glass plate and the intermediate film is colored in a manner that a color difference between first and second parts of the laminate is not higher than 2.4, in which the first part includes the optically functioning film while the second part is other than the first part.

16 Claims, 1 Drawing Sheet

LAMINATE INCLUDING OPTICALLY FUNCTIONING FILM

BACKGROUND OF THE INVENTION

1. Field of the Invention

This invention relates to improvements in a laminate such as a laminated glass including an optically functioning film, and more particularly to such a laminate to be used in a head-up display system which is configured, for example, such that a driver of an automotive vehicle can observe an image of driving information projected as displaying light on a windshield while looking a frontal view through the windshield in such a manner that the driving information is superimposed on the frontal view.

2. Description of the Prior Art

Hitherto a variety of head-up display systems of an automotive vehicle have been proposed and put into practical use. A typical one of them is configured by directly coating a reflecting film on a windshield glass. Another typical one is configured by interposing a film having a reflecting film between two glass plates of a windshield as disclosed, for example, in Japanese Patent Provisional Publication No. 2-141720. Additionally, it has been already proposed that an optically functioning film such as a polarization-direction changing film is disposed between two glass plates of a windshield of laminated glass. In connection with such a laminated glass, the inventors of the present invention has also proposed measures to not only improve penetration resistance and impact resistance but also suppress the baneful influence of ultraviolet ray of sunlight, as disclosed in a related U.S. patent application Ser. No. 08/621379 entitled "Glass Arrangement".

However, drawbacks have been encountered in the above-discussed head-up display systems including the optically functioning film such as the polarization-direction changing film. That is, the polarization-direction changing film is made of, for example, a liquid crystal high polymer which is in twisted nematic orientation under a liquid crystal condition and is in a glassy state at a temperature lower than liquid crystal transition point thereof, and therefore it is generally yellowish though transparent. It is difficult to render the polarization-direction changing film colorless.

In case that such an optically functioning film is used upon being bonded to a colorless and transparent glass plate, the yellowish color of the optically functioning film is conspicuous, in which the yellowish color becomes further conspicuous without deterioration of optical characteristics of the film especially upon lapse of a long time. This not only deteriorates the external appearance of the head-up display system but also is disadvantageous from the view point of safety in case that the optically functioning film is bonded to a front windshield of an automotive vehicle constituting a combiner of the head-up display system.

SUMMARY OF THE INVENTION

It is an object of the present invention is to provide an improved laminate including an optically functioning film, which can effectively overcome drawbacks encountered in conventional laminates which are used, for example, for a head-up display system of an automotive vehicle.

Another object of the present invention is to provide an improved laminate including an optically functioning film, in which the yellowish color of the optically functioning film is rendered inconspicuous so as to improve not only external appearance but also safety of the laminate.

A further object of the present invention is to provide an improved laminate including an optically functioning film, in which a color difference between a first part (containing the optically functioning film) and a second part other than the first part of the laminate is relatively low to such an extent that the existence of the optically functioning film cannot be recognized under observation by the naked eyes.

An aspect of the present invention resides in a laminate comprising at least a first glass plate. An optically functioning film is bonded to the first glass plate. The at least a first glass plate is colored in a manner that a color difference between first and second parts of the laminate is not higher than 2.4, the first part including the optically functioning film, the second part being other than the first part.

Another aspect of the present invention resides in a laminate comprising first and second glass plates which are respectively located outside and inside relative to a compartment. An intermediate film is disposed between the first and second glass plates to bond the first and second glass plates to each other. An optically functioning film is bonded to the first glass plate. At least one of the first glass plate, the second glass plate and the intermediate film is colored in a manner that a color difference between first and second parts of the laminate is not higher than 2.4, the first part including the optically functioning film, the second part being other than the first part.

A further aspect of the present invention resides in a laminate comprising a glass plate. An optically functioning film is bonded to the glass plate. The glass plate is colored in a manner that a color difference between first and second parts of the laminate is not higher than 2.4, the first part including the optically functioning film, the second part being other than the first part.

A still further aspect of the present invention resides in a laminate comprising a glass plate. A transparent plastic plate is bonded to the glass plate. An optically functioning film is bonded to the first glass plate. At least one of the glass plate and the transparent plastic plate is colored in a manner that a color difference between first and second parts of the laminate is not higher than 2.4, the first part including the optically functioning film, the second part being other than the first part.

With the above-discussed laminates according to the present invention, the existence of the optically functioning film (such as the polarization-direction changing film) is made inconspicuous to such an extent not to be recognized under observation by the naked eye even though the optically functioning film is assumed yellow. Accordingly, in case that the laminate is used as a front windshield of an automotive vehicle, the external appearance of the front windshield can be improved not only in external appearance of thereof and but also in safety thereof.

DETAILED DESCRIPTION OF THE INVENTION

Figure 1:
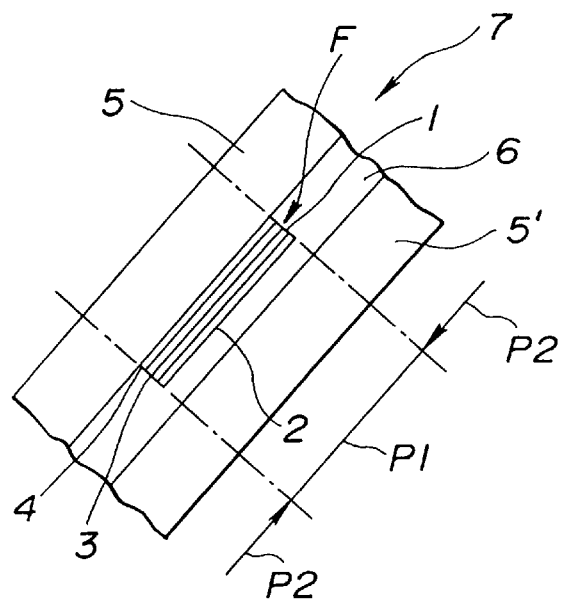
FIG. 1 is a fragmentary sectional view of first and second embodiments (Examples) of a laminate according to the present invention.

According to the present invention, a laminate comprises at least a glass plate. An optically functioning film is bonded to the glass plate. At least the glass plate is colored in a manner that a color difference between first and second parts of said laminate is not higher than 2.4, in which the first part includes the optically functioning film, and the second part is other than the first part. The laminate is used, for example, as a front windshield of an automotive vehicle.

The color difference used in the present invention is defined according to a so-called Lab system provided in Japanese Industrial Standard (JIS) Z8730 (Methods for Specification of Color Differences for Opaque Materials), item 6. 3. In case that two (first and second) colorless glass plates (each having a thickness of 2 mm) are laminated to form a laminated glass in which the optically functioning film is disposed therebetween, the color difference between first and second parts of the laminated glass is about 2.6 in which first part includes the optically functioning film while the second part is other than the first part. In this case, the optically functioning film is conspicuously looked yellowish, and therefore the existence of the optically functioning film can be clearly recognized under observation by the naked eye. However, in case that the color difference is lowered to a value not higher than 2.4, the optically functioning film cannot be clearly recognized under observation by the naked eye so that the yellowish color of the optically functioning film becomes inconspicuous to such an extent as not to be nervous about existence of the optically functioning film. Preferably, the outside (outboard-side) glass plate is colored and provided with an ultraviolet ray absorbing ability. The outside glass plate is located outside relative to a compartment (a passenger compartment in case that the laminate is a front windshield of an automotive vehicle) though not shown.

Additionally, a barrier film is interposed between the optically functioning film and the intermediate film thereby reducing the baneful influence of ultraviolet ray and of plasticizer contained in the intermediate film against the optically functioning film. Further, the optically functioning film is bonded to the outside (outboard-side) glass plate, and the laminate is sufficiently high in impact resistance against an impact from the outside of the compartment so that the laminate can pass an impact resistance test and a penetration resistance test according to JIS R3211 (Automotive Safety Glass) and R3212 (Test Method for Automotive Safety Glass).

The reasons for the above is as follows: When the impact is applied from the outside of the passenger compartment to the laminate, for example, including the outside (outboard-side) and inside (inboard-side) glass plates, the outside glass plate to which the impact is applied is broken and peeled off because the optically functioning film is bonded to the outside glass plate, exhibiting a not so high bonding force between the outside glass plate and the optically functioning film, particularly as compared with a bonding force between a glass plate and the intermediate film of polyvinyl butyral. However, the inside glass plate is firmly bonded to the intermediate film, and therefore the inside glass plate is hardly peeled off and scattered in the passenger compartment. Thus, the laminate or laminated glass of the present invention can meet the requirements in penetration resistance and impact resistance provided in JIS.

In case that the laminate includes only one or single glass plate, the glass plate is colored in a manner that the color difference between the first and second parts of the laminate becomes not higher than 2.4, so that the existence of the optically functioning film becomes inconspicuous.

In case that the laminate includes the glass plate and a transparent plastic plate which are bonded to each other, the optically functioning film is bonded to the glass plate, in which at least one of the glass plate and the plastic plate is colored in a manner that the color difference between the first and second parts of the laminate is not higher than 2.4. Accordingly, the existence of the optically functioning film becomes inconspicuous.

In both the cases of using the single glass plate and using the glass plate and the transparent plastic plate, baneful influence of ultraviolet ray of sunlight can be suppressed by providing an ultraviolet ray absorbing ability to the glass plate.

The laminate of the present invention will be discussed further in detail hereinafter.

In the case of the laminate comprising the first and second glass plates which are located outside and inside the compartment, the first and second glass plates are bonded to each other by means of the intermediate film interposed between the first and second glass plates. The optically functioning film is bonded to the first glass plate. Additionally, at least one of the first glass plate, the second glass plate and the intermediate film is colored in a manner that the color difference between the first and second parts is not higher than 2.4. Preferably, one of the first and second glass plates is a colored glass plate. The colored glass plate may be a heat absorbing glass (plate) which is produced by adding a slight amount of at least one of $Fe_2O_3$, $CeO_2$, $CoO$, $Se$, $Cr_2O_3$ as a coloring component to, for example, a soda-lime silica glass as a basic glass component so that the glass is colored blue, bronze, green or the like. The colored glass plate may be formed of a heat reflecting glass (plate) which is produced by coating a metal oxide onto a float glass plate. Such colored glass plates have an ultraviolet ray absorbing ability to some extent and therefore are preferable to be used as the first (outside or outboard-side) glass plate. It is further preferable that the former colored glass plate (the heat absorbing glass plate) further contains $TiO_2$ to improve an ultraviolet ray absorbing ability, in which $TiO_2$ is added to the component of the heat absorbing glass and then molten and fabricated as a glass plate. It will be understood that both the first and second (inside or inboard-side) glass plates may be colored. Additionally, it will be also understood that the intermediate film may be colored. The intermediate film of the present invention is made of polyvinyl butyral or the like.

In the case that the laminate comprises the single or only one glass plate, the optically functioning film is bonded to the glass plate, and the glass plate is colored in a manner that the color difference between the first and second parts of the laminate is not higher than 2.4. The first part includes the optically functioning film, while the second part is other than the first part. Also in this case, the glass plate may be the heat absorbing glass (plate) or the heat reflecting glass (plate).

In the case that the laminate comprises the glass plate and a transparent plastic plate (made of, for example, polyethylene terephthalate) which are bonded to each other through the intermediate film which is interposed between the glass plate and the plastic plate, the optically functioning film is bonded to the glass plate, and at least one of the glass plate and the transparent plastic plate is colored in a manner that the color difference between the first and second parts of the laminate is not higher than 2.4. The first part includes the optically functioning film, while the second part is other than the first part. This arrangement is also applied to the case of the laminate in which a transparent plastic plate formed of a transparent thermoplastic material such as polyurethane resin is bonded to the glass plate so as to improve a penetration resistance of the laminate. It is preferable to color the glass plate located outside the compartment from the view point of protecting the optically functioning film. The transparent plastic plate may be colored. It is also preferable that the glass plate located outside the compartment is the heat absorbing glass (plate) or the heat reflecting glass (plate).

It will be appreciated that the laminate of the present invention may be used as an architectural windowpane other than the automotive front windshield.

Next, the principle of the present invention will be discussed further in detail with reference to Examples 1 and 2 shown in FIG. 1 and Example 3 shown in FIG. 2.

EXAMPLE 1

Figure 2:
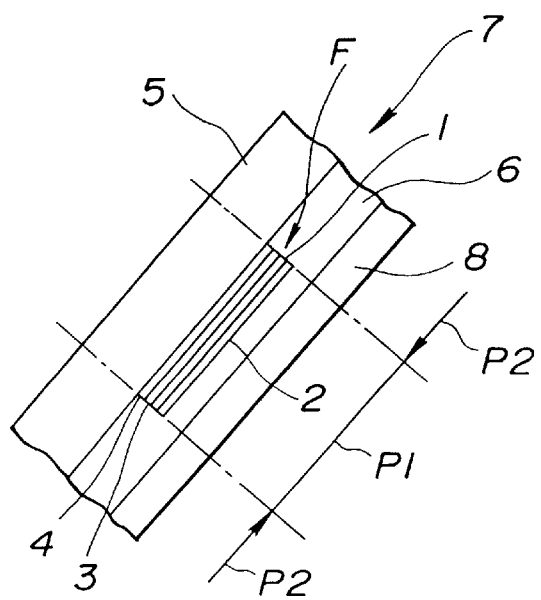
FIG. 2 is a fragmentary sectional view of a third embodiment (Example) of the laminate according to the present invention.

As shown in FIG. 1, the laminate (laminated glass) 7 comprised the optically functioning film 1 which was a polarization-direction changing film which functions to rotate a plane of polarization of light to be incident thereon. The polarization-direction changing film 1 in this Example includes a liquid crystal high polymer which is in twisted nematic orientation under a liquid crystal condition and is in a glassy state at a temperature lower than liquid crystal transition point thereof. The laminate 7 of this Example is used as a front windshield of an automotive vehicle.

The polarization-direction changing film 1 was formed as follows: The liquid crystal high polymer was coated on a transparent substrate such as a plastic film formed of, for example, polyethylene terephthalate (PET). Then, a shearing force was applied to the liquid crystal high polymer, and thereafter the liquid crystal high polymer was subjected to heat-treatment and then cooled so that a liquid crystal orientation is fixed. Examples of such a liquid crystal high polymer were a main-chain type polymer such as optically active polyester, polyamide, polycarbonate, and polyesterimide, and a side-chain type polymer such as optically active polyacrylate, polymethacrylate, and polymalonate.

The thus obtained polarization-direction changing film 1 having a thickness, for example, of 5 μm was provided at its opposite surfaces with a barrier layer 2 formed of an acrylic resin and having a thickness, for example, of 5 μm and with a protective layer 3 formed of an acrylic resin and having a thickness, for example, of 5 μm, in a manner that the polarization-direction changing film 1 was interposed between the barrier layer 2 and the protective layer 3 thereby forming an optical laminated film F. The barrier layer 2 served to prevent plasticizer in the intermediate film 6 from moving into the polarization-direction changing film 1. The optical laminated film F was adhered to the inboard-side surface of an outboard-side glass plate 5 with an adhesive 4, in which the glass plate 5 had a thickness, for example, of 2 mm.

Here, the inside (inboard-side) glass plate had a composition including 0.5% by weight of SiO2, 2.04% by weight of $Al_2O_3$, 8.39% by weight of CaO, 3.7% by weight of MgO, 12.9% by weight of $Na_2O$, 0.94% by weight of $K_2O$, 0.19% by weight of $SO_3$, 0.69% by weight of $Fe_2O_3$, 0.4% by weight of $CeO_2$, 0.2% by weight of $TiO_2$, and a slight amount of NiO and MnO, assuming a green color so as to exhibit a high ultraviolet ray absorbing ability.

Thereafter, the outside (outboard-side) glass plate 5 with the optical laminated film F including the polarization-direction changing film 1 was arranged such that the intermediate film 6 of polyvinyl butyral is interposed between the outside and inside glass plates 5, 5'. Then, the thus arranged laminate structure is subjected to a usual autoclave treatment, thereby forming the laminate or laminated glass 7.

The thus formed laminate 7 is subjected to measurement of the color difference according to the Lab system provided in Japanese Industrial Standard (JIS) Z8730, item 6. 3. As a result of this measurement, the color difference between the first and second parts P1, P2 of the laminate 7 was 2.3. The first part P1 contained the optically functioning film 1, while the second part P2 did not contain the optically functioning film 1 and is other than the first part P1. Thus, the color difference is lowered to such an extent as not to be nervous about existence of the optical laminated film F including the polarization-direction changing film 1.

Further, the laminate 7 was subjected to an impact resistance test and a penetration resistance test which were according to JIS Nos. R3211 (Automotive Safety Glass) and R3212 (Test Method for Automotive Safety Glass). As a result of these tests, it was confirmed that the laminate 7 met the impact resistance and penetration resistance provided in JIS.

EXAMPLE 2

The laminate (laminated glass) 7 of Example 2 was produced in the same way as that in Example 1 and had the same arrangement as that of Example 1 with the exception that the outside (outboard-side) glass plate 5 is a heat absorbing glass (plate) assuming a blue color. Accordingly, the structure of the laminate 7 of this Example was represented as shown in FIG. 1. In this Example, the outside glass plate 5 had a composition including 71.4% by weight of $SiO_2$, 1.99% by weight of $Al_2O_3$, 8.38% by weight of CaO, 3.6% by weight of MgO, 12.9% by weight of $Na_2O$, 1.05% by weight of $K_2O$, 0.19% by weight of $SO_3$, 0.39% by weight of $Fe_2O_3$, and a slight amount of CoO and NiO, assuming the blue color.

As a result of measurement of the color difference between the first and second parts P1, P2 of the laminate 7, it was confirmed that the color difference between the first and second parts of the laminate 7 was 2.4, so that the color difference was lowered to such an extent as not to be nervous about existence of the optical laminated film F including the polarization-direction changing film 1.

Further, the laminate 7 was subjected to the impact resistance test and the penetration resistance test. As a result of these tests, it was confirmed that the laminate 7 of this Example met the impact resistance and penetration resistance provided in JIS.

It will be understood that the outside (outboard-side) glass plate 5 of this Example is lower in ultraviolet ray absorbing ability than that of Example 1. In this regard, it is preferable that the adhesive 4 is of the acrylic resin system (containing acrylic resin as a main component) contains an ultraviolet ray absorbing agent of benzotriazole system (containing benzotriazole as a main component), thereby preventing the optically functioning film (polarization-direction changing film) 1 from being effected by ultraviolet ray of sunlight while having a high ultraviolet ray absorbing ability.

EXAMPLE 3

As shown in FIG. 3, the laminate 7 of this Example comprised the optically functioning film or polarization-direction changing film 1 having a thickness, for example, of 5 μm. This optically functioning film 1 was provided at its opposite surfaces with the barrier layer 2 formed of an acrylic resin and having a thickness, for example, of 5 μm and the protective layer 3 formed of an acrylic resin and having a thickness, for example, of 5 μm in the same manner as that in Example 1, so that the polarization-direction changing film 1 was interposed between the barrier layer 2 and the protective layer 3 thereby forming the optical laminated film F. The barrier layer 2 served to prevent plasticizer in the intermediate film 6 from diffusion into the polarization-direction changing film 1. The optical laminated film F was adhered to the inboard-side surface of the outboard-side glass plate 5 with the adhesive 4, in which the glass plate 5 was a heat absorbing glass (plate) and had a thickness, for example, of 3.1 mm assuming a bronze color. In this Example, the outside glass plate 5 had a composition including 71.4% by weight of $SiO_2$, 2.02% by weight of $Al_2O_3$, 8.41% by weight of CaO, 3.72% by weight of MgO, 13.0% by weight of $Na_2O$, 1.04% by weight of $K_2O$, 0.19% by weight of $SO_3$, 0.21% by weight of $Fe_2O_3$, and a slight amount of CoO, NiO and Se, assuming the bronze color.

Thereafter, the outside (outboard-side) glass plate 5 with the optical laminated film F including the polarization-direction changing film 1 was arranged such that the intermediate film 6 of polyvinyl butyral was interposed between the outside glass plates 5 and a transparent plastic layer or plate 8 which had a thickness of 100 μm and was made of polyethylene terephthalate. Then, the thus arranged laminate structure was subjected to the usual autoclave treatment, thereby forming the laminate or laminated glass 7.

The thus formed laminate 7 was subjected to measurement of the color difference in the same manner as that in Example 1. As a result of this measurement, the color difference between the first and second parts of the laminate 7 was 2.4. Thus, the color difference was lowered to such an extent as not to be nervous about existence of the optical laminated film F including the polarization-direction changing film 1.

Apart from Examples, a green-colored front windshield of the following type has been put into practical use: The windshield is a laminated glass including two glass plates one of which is colored green. In case that the principle of the present invention is applied to such a windshield under a condition in which the liquid crystal high polymer of the polarization-direction changing film 1 is slightly yellowish when polymerized, it is preferable that the optical laminated film F including the polarization-direction changing film 1 is colored blue or green, for example, by adding phthalocyanine pigments into a overcoat layer (such as the barrier layer 2 and/or the protective layer 3) of the polarization-direction changing film 1.

What is claimed is:

1. A laminate comprising:
   at least a first glass plate; and
   an optically functioning film bonded to said first glass plate;
   wherein at least a part of said laminate is colored, wherein a color difference between first and second parts of said laminate is not higher than 2.4 in CieLab units, each of said first and second parts extending in a direction of thickness of said laminate and containing portions of opposite surfaces of said laminate, said first part including said optically functioning film, said second part being other than said first part.

2. A laminate comprising:
   first and second glass plates which are respectively located outside and inside a compartment;
   an intermediate film disposed between said first and second glass plates to bond said first and second glass plates to each other; and
   an optically functioning film bonded to said first glass plate;
   wherein at least one of said first glass plate, said second glass plate and said intermediate film is colored, wherein a color difference between first and second parts of said laminate is not higher than 2.4 in CieLab units, each of said first and second parts extending in a direction of thickness of said laminate and containing portions of opposite surfaces of said laminate, said first part including said optically functioning film, said second part being other than said first part.

3. A laminate as claimed in claim 2, wherein said second glass plate is colored and includes means for demonstrating a ultraviolet ray absorbing ability, wherein said laminate further comprises a barrier film interposed between said optically functioning film and said intermediate film to protect said optically functioning film from being chemically affected by said intermediate film.

4. A laminate comprising:
   a colored glass plate; and
   an optically functioning film bonded to said glass plate;
   wherein a color difference between first and second parts of said laminate is not higher than 2.4 in CieLab units, each of said first and second parts extending in a direction of thickness of said laminate and containing portions of opposite surfaces of said laminate, said first part including said optically functioning film, said second part being other than said first part.

5. A laminate as claimed in claim 4, wherein said glass plate is located outside a compartment, and said optically functioning film is located inside the compartment, wherein said glass plate includes means for demonstrating an ultraviolet ray absorbing ability.

6. A laminate comprising:
   a glass plate;
   a transparent plastic plate bonded to said glass plate; and
   an optically functioning film bonded to said first glass plate;
   wherein at least one of said glass plate and said transparent plastic plate is colored, wherein a color difference between first and second parts of said laminate is not higher than 2.4 in CieLab units, each of said first and second parts extending in a direction of thickness of said laminate and containing portions of opposite surfaces of said laminate, said first part including said optically functioning film, said second part being other than said first part.

7. A laminate as claimed in claim 6, wherein said glass plate is located outside a compartment, and said optically functioning film is located inside the compartment, wherein said glass plate includes means for demonstrating an ultraviolet ray absorbing ability.

8. A laminate comprising:
   at least a first glass plate; and
   an optically functioning film bonded to said first glass plate;
   wherein at least a part of said laminate is colored, wherein a color difference between first and second parts of said laminate is not higher than 2.4 in CieLab units, each of said first and second parts extending in a direction of thickness of said laminate and containing portions of opposite surfaces of said laminate, said first part including said optically functioning film, said second part being other than said first part;
   wherein said optically functioning film is a polarization-direction changing film for rotating a plane of polarization of light to be incident thereon.

9. A laminate according to claim 2, wherein said intermediate film comprises polyvinyl butyral.

10. A laminate according to claim 3, wherein said barrier film comprises acrylic resin.

11. A laminate according to claim 3, wherein said means for demonstrating an ultraviolet ray absorbing ability comprises $TiO_2$ or benzotriazole.

12. A laminate according to claim 2, wherein said first glass plate comprises a coloring component selected from the group consisting of $Fe_2O_3$, $CeO_2$, CoO, Se, $Cr_2O_3$, NiO, and combinations of at least two thereof.

13. A laminate according to claim 6, wherein said plastic plate comprises polyethylene terephthalate.

14. A laminate according to claim 2, further comprising a protective layer disposed between said optically functioning film and said first glass plate.

15. A laminate according to claim 14, wherein said protective layer comprises acrylic resin.

16. A laminate according to claim 3, wherein said barrier layer is colored by phthalocyanine pigment.

* * * * *